US012609397B2

(12) United States Patent
Kim et al.

(10) Patent No.: US 12,609,397 B2
(45) Date of Patent: Apr. 21, 2026

(54) BATTERY RACK, POWER STORAGE DEVICE, AND CONTAINER

(71) Applicant: LG ENERGY SOLUTION, LTD., Seoul (KR)

(72) Inventors: Hee-Chan Kim, Daejeon (KR); Kyung-Min Lee, Daejeon (KR); Seung-Jun Lee, Daejeon (KR); Kown Son, Daejeon (KR); Goan-Su Jung, Daejeon (KR); Jong-Soo Lee, Daejeon (KR); Seung-Joon Jeon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 477 days.

(21) Appl. No.: 18/028,640

(22) PCT Filed: Oct. 18, 2021

(86) PCT No.: PCT/KR2021/014520
§ 371 (c)(1),
(2) Date: Mar. 27, 2023

(87) PCT Pub. No.: WO2022/086099
PCT Pub. Date: Apr. 28, 2022

(65) Prior Publication Data
US 2023/0335854 A1      Oct. 19, 2023

(30) Foreign Application Priority Data

Oct. 19, 2020    (KR) ......................... 10-2020-0135384

(51) Int. Cl.
H01M 50/264      (2021.01)
H01M 50/256      (2021.01)
(Continued)

(52) U.S. Cl.
CPC ....... H01M 50/264 (2021.01); H01M 50/256 (2021.01); H01M 50/262 (2021.01); H01M 50/271 (2021.01)

(58) Field of Classification Search
None
See application file for complete search history.

(56) References Cited

U.S. PATENT DOCUMENTS 10,529,965 B2 *   1/2020   Kim .................... H01M 50/505
2012/0263989 A1   10/2012   Byun et al.
(Continued)

FOREIGN PATENT DOCUMENTS

CN          202058663 U      11/2011
CN          202602331 U      12/2012
(Continued)

OTHER PUBLICATIONS

Machine Translation of KR_20180101859 (Year: 2018).*
(Continued)

*Primary Examiner* — Gregg Cantelmo
(74) *Attorney, Agent, or Firm* — Birch, Stewart, Kolasch & Birch, LLP

(57) ABSTRACT

A battery rack may be stably fixed during transport, and include a power storage device, and a container. A battery rack includes a plurality of battery modules, at least one rack case to accommodate the plurality of battery modules, and at least two rings located on the rack case and configured to threaded with a strap.

12 Claims, 5 Drawing Sheets

(51) Int. Cl.
      *H01M 50/262*     (2021.01)
      *H01M 50/271*     (2021.01)

(56)                References Cited

U.S. PATENT DOCUMENTS

| 2018/0213667 | A1 | 7/2018 | Midday et al. |
| 2018/0358590 | A1 | 12/2018 | Nakano et al. |

FOREIGN PATENT DOCUMENTS

| CN | 204558893 | U | 8/2015 | | |
| CN | 207320204 | U | 5/2018 | | |
| CN | 111196446 | A | 5/2020 | | |
| CN | 211667458 | U | 10/2020 | | |
| JP | 4-38662 | U | 3/1992 | | |
| JP | 7-4339 | U | 1/1995 | | |
| JP | 7-10996 | U | 2/1995 | | |
| JP | 7-43951 | Y2 | 10/1995 | | |
| JP | 8-169242 | A | 7/1996 | | |
| JP | 10-111036 | A | 4/1998 | | |
| JP | 10-190261 | A | 7/1998 | | |
| JP | 3089757 | U | 11/2002 | | |
| JP | 2014-81292 | A | 5/2014 | | |
| KR | 10-1255243 | B1 | 4/2013 | | |
| KR | 10-1648939 | B1 | 8/2016 | | |
| KR | 10-1712073-1 | | 3/2017 | | |
| KR | 10-2017-0073331 | A | 6/2017 | | |
| KR | 10-1816211 | B1 | 1/2018 | | |
| KR | 10-2018-0050085 | A | 5/2018 | | |
| KR | 10-2018-0101859 | A | 9/2018 | | |
| WO | WO 2016/175270 | A1 | 11/2016 | | |
| WO | WO 2017/146174 | A1 | 8/2017 | | |
| WO | WO-2020111677 | A1 * | 6/2020 | ......... | H01M 50/204 |

OTHER PUBLICATIONS

Machine Translation of WO-2020111677-A1 (Year: 2020).*

European Search Report for European Application No. 21883168.3, dated Jun. 28, 2024.

International Search Report (PCT/ISA/210) issued in PCT/KR2021/014520, dated Jan. 28, 2022.

* cited by examiner

FIG. 3

BATTERY RACK, POWER STORAGE DEVICE, AND CONTAINER

TECHNICAL FIELD

The present disclosure relates to a battery rack, a power storage device, and a container, and more particularly, to a battery rack that may be stably fixed during transport, a power storage device, and a container.

The present application claims priority to Korean Patent Application No. 10-2020-0135384 filed on Oct. 19, 2020 in the Republic of Korea, the disclosures of which are incorporated herein by reference.

BACKGROUND ART

Currently commercialized secondary batteries include nickel-cadmium batteries, nickel-hydrogen batteries, nickel-zinc batteries, and lithium secondary batteries, and among them, lithium secondary batteries have almost no memory effect compared to nickel-based secondary batteries, and thus, are in the spotlight for their advantages of free charge and discharge, extremely low self-discharge rate, and high energy density.

These lithium secondary batteries mainly use a lithium-based oxide and a carbon material as a positive electrode active material and a negative electrode active material, respectively. Lithium secondary batteries include an electrode assembly in which a positive electrode plate and a negative electrode plate, to which a positive electrode active material and a negative electrode active material are applied, respectively, are arranged with a separator therebetween, and an exterior for sealing and accommodating the electrode assembly together with an electrolyte, that is, a battery pouch exterior.

Recently, secondary batteries have been widely used not only in small devices such as portable electronic devices, but also in medium and large devices such as vehicles or power storage devices. When used in the medium and large devices, a number of secondary batteries are electrically connected to each other to increase capacity and output. Especially, pouch-type secondary batteries are widely used in the medium and large devices due to an advantage of easy stacking.

Meanwhile, as a need for a large-capacity structure, including use as an energy storage source, increases, there is an increasing demand for a battery rack including a plurality of secondary batteries electrically connected in series and/or parallel, and a battery rack including a battery module accommodating the secondary batteries therein and a battery management system (BMS).

Also, the battery rack generally includes a rack case of a metal material to protect a plurality of battery modules from external impact or accommodate and store the plurality of battery modules. Furthermore, recently, as a demand for a high-capacity battery rack is increasing, a demand for a battery rack accommodating a plurality of battery modules of a heavy load is increasing.

However, when being transported while being accommodated in a container, a battery rack with such a heavy load is subject to vibration, shaking, or large inclination during transport, and especially, it is difficult to stably keep the battery rack in a fixed state against a large external impact, resulting in problems such as deformation of or damage to a battery case.

DISCLOSURE

Technical Problem

The present disclosure is designed to solve the problems of the related art, and therefore the present disclosure is directed to providing a battery rack that is easy to install, a power storage device, and a container.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A battery rack according to the present disclosure for achieving the object includes:

a plurality of battery modules; at least one rack case to accommodate the plurality of battery modules; at least two rings located on the at least one rack case and a strap connected to the at least two rings.

Also, the battery rack may further include a fixing member including a fixing portion to be fixed to the ground, a ring portion located on the fixing portion, and a bent portion that is bent at least twice and extends from the fixing portion covers a portion of the at least one rack case.

In addition, the at least one rack case may include at least two rack cases arranged in a horizontal direction.

In addition, in the battery rack, the strap may be threaded through a ring provided on each of the at least two rack cases so that the at least two rack cases are bound to each other.

Also, the battery rack may further include a support member having a lower portion of a body fixed to a ground or an installation place and having a side portion of the body supporting a side portion of the rack case.

Furthermore, the at least one rack case may include two or more rack cases arranged in a horizontal direction.

The strap may cover a front surface of a rack case located relatively forward among the two or more rack cases arranged in the horizontal direction.

In addition, each of the two or more rack cases may include at least four pillar portions extending in a vertical direction.

A stopper including a restraining portion that is bent covers a first pillar portion of each of the two or more rack cases.

Furthermore, the Stopper May Further Include:

a horizontally extended portion extending in a horizontal direction to be fixed to a ground; and a vertically extended portion extending, from the horizontally extended portion, upward along a side portion of the rack case.

In this regard, the restraining portion may protrude and extend from the vertically extended portion toward the first pillar portion of each of the two or more rack cases.

Also, the battery rack may further include a packaging material to cover an outer surface of the at least one rack case.

Furthermore, a power storage device of the present disclosure for achieving the object includes at least one battery rack.

In addition, a container of the present disclosure for achieving the object includes at least one battery rack.

Advantageous Effects

According to one aspect of the present disclosure, the present disclosure includes a ring located on a rack case and threaded with a strap, and thus the rack case can be fixed to the ground. Especially, the battery rack of the present disclosure can be stably fixed to the ground even when an external impact occurs during transport. Accordingly, the present disclosure can improve safety.

Furthermore, in the related art, because a strap can only be fixed to a ground, there is a limitation that a fixing position of the strap cannot be changed arbitrarily. In contrast, the present disclosure has an advantage in that an end portion of a strap may be threaded or tied and fixed to a desired position by utilizing a ring portion of a fixing member in a container or a truck, and a more efficient arrangement of the strap may be achieved, thereby increasing fixing power of a battery rack and maintaining stable fixing.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 3 is a perspective view schematically showing a fixing member of a battery rack, according to an embodiment of the present disclosure.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
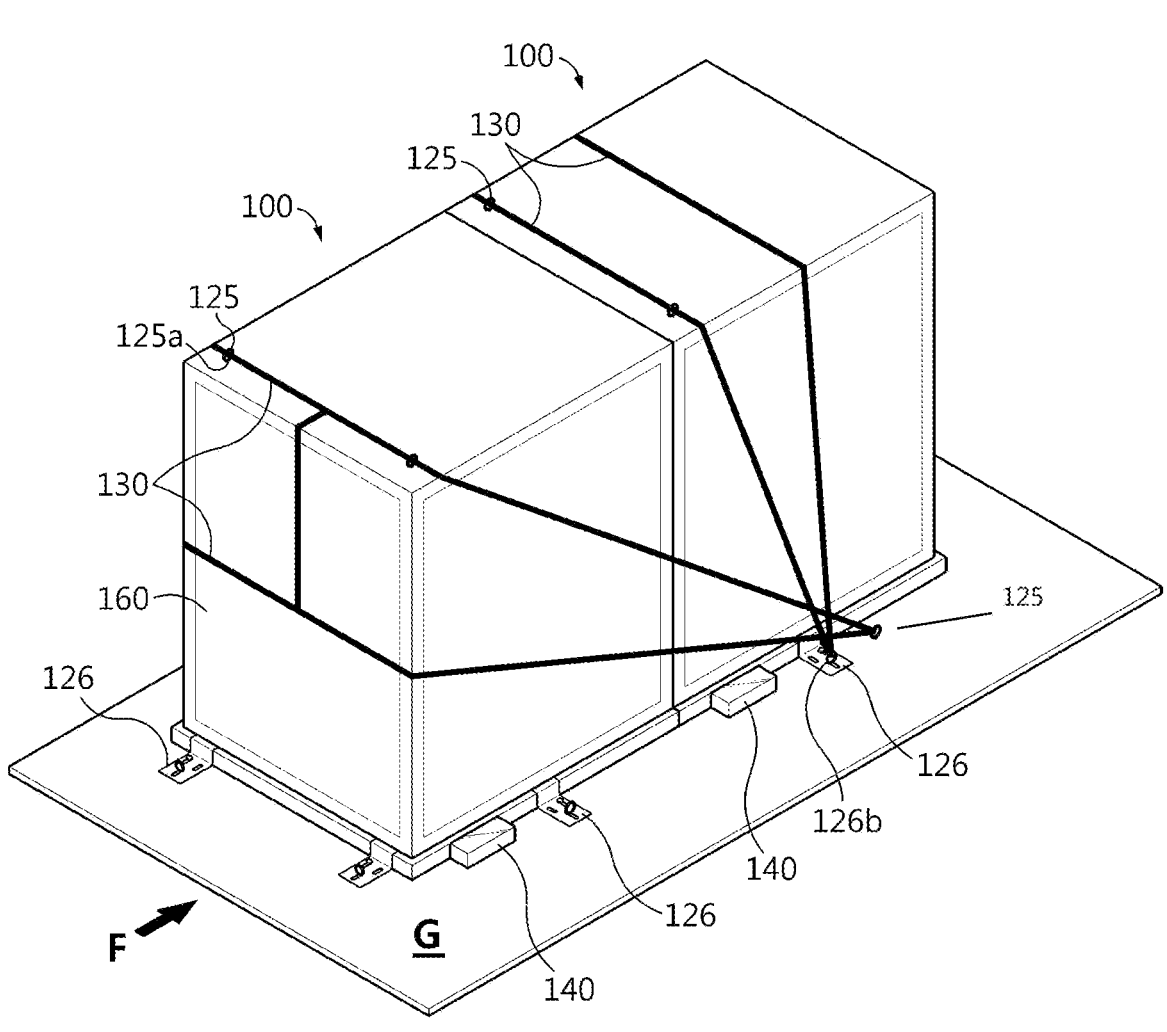
FIG. 1 is a perspective view schematically showing battery racks according to an embodiment of the present disclosure.
Figure 2:
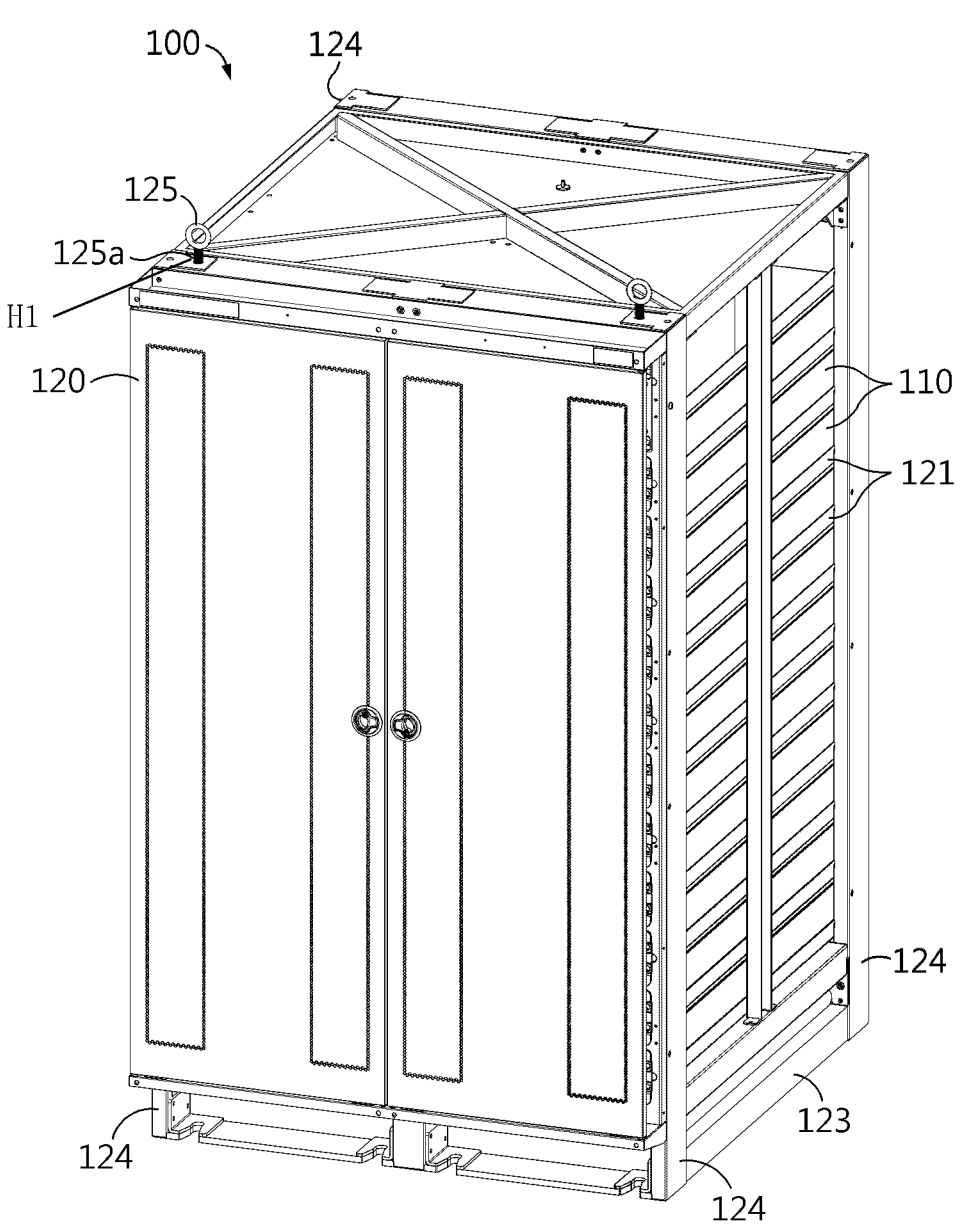
FIG. 2 is a perspective view schematically showing a battery rack according to an embodiment of the present disclosure.
Figure 3:
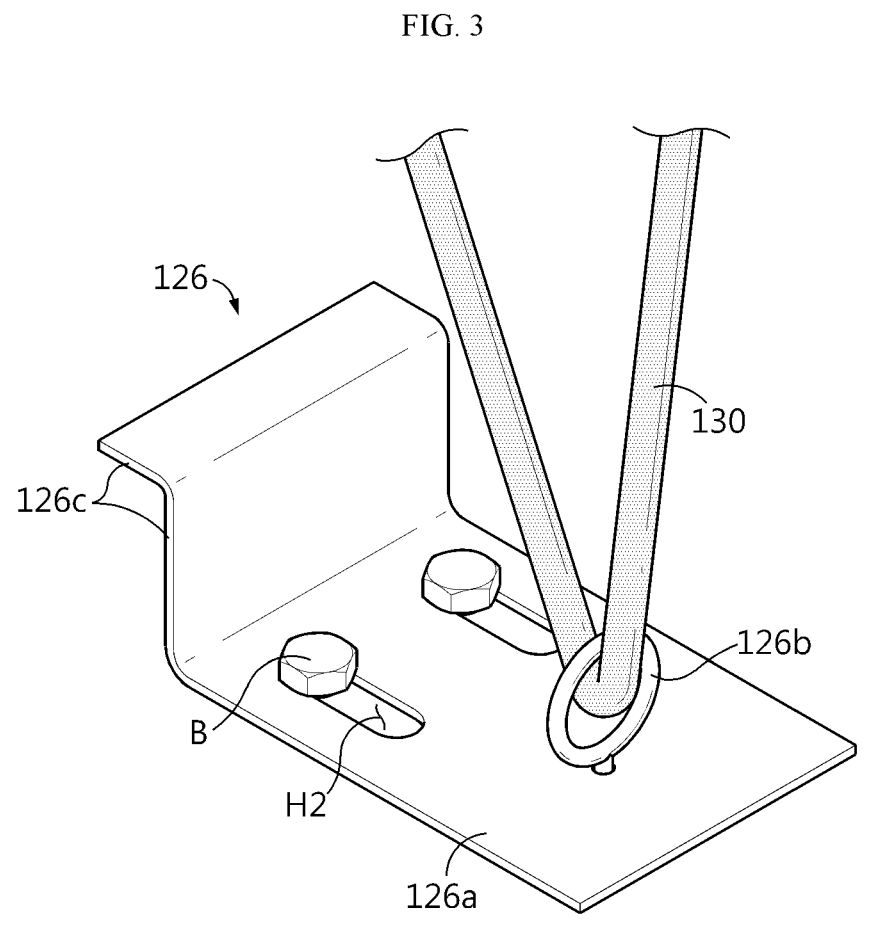

FIG. 1 is a perspective view schematically showing battery racks according to an embodiment of the present disclosure. FIG. 2 is a perspective view schematically showing a battery rack according to an embodiment of the present disclosure. Also, FIG. 3 is a perspective view schematically showing a fixing member of a battery rack, according to an embodiment of the present disclosure. For convenience of drawing description, the battery rack shown in FIG. 2 is shown with a packaging material removed.

Referring to FIGS. 1 to 3, a battery rack 100 according to an embodiment of the present disclosure may include a plurality of battery modules 110 and at least one rack case 120 to accommodate the plurality of battery modules 110.

Specifically, the plurality of battery modules 110 may be accommodated in the rack case 120 to be arranged in upward and downward directions. Each of the battery modules 110 may include a module housing 111 and a plurality of battery cells (not shown) provided in the module housing 111 and stacked in one direction. For example, each of the battery cells may be a pouch-type battery cell.

However, the battery cell of the battery module 110 according to the present disclosure is not limited to the pouch-type battery cell described above, and various battery cells known at the time of filing of the present disclosure may be employed.

Also, the rack case 120 may accommodate the plurality of battery modules 110 therein. For example, as shown in FIG. 2, the rack case 120 may include a plurality of storing plates 121 for storing one battery module 110. Two of the plurality of storing plates 121 may support in an upward direction lower end portions of the battery module 110 in left and right sides. Also, the two storing plates 121 may prevent the other battery module 110 placed thereunder from moving upward.

Furthermore, the rack case 120 may include at least two rings 125. The ring 125 may include an insertion portion 125a having a portion inserted and fixed to a bolting hole H1 formed on the rack case 120. The insertion portion 125a may be screw-coupled to the bolting hole H1. The ring may include a metal having excellent mechanical rigidity. The metal may be, for example, a steel or stainless iron. The ring 125 may be threaded with a strap 130. The strap 130 may include a chemical fiber, polyester, or polyethylene material.

For example, as shown in FIG. 1, two or more rings 125 may be provided on the rack case 120. Eight bolt holes into which the ring 125 may be inserted and fixed may be provided on the rack case 120. Each of the two rings 125 may be threaded with the strap 130. Both end portions of the strap 130 may be fixed to a ground G. In this regard, two rings 125 or eye bolts are also provided on the ground G, so that both end portions of the strap 130 may be threaded through each of the two rings 125 or tied to the rings.

In addition, the rack case 120 may include a packaging material 160 to cover a body thereof. For example, the packaging material 160 may be coated on an outer surface of a rack case 120 of each of a plurality of battery racks 100 shown in FIG. 1. Here, the packaging material 160 may include a material such as vinyl or a cloth made of synthetic fibers.

Therefore, according to this configuration of the present disclosure, the present disclosure includes the ring 125 located on the rack case 120 and threaded with the strap 130, and thus the rack case 120 may be fixed to the ground G. Especially, the battery rack 100 of the present disclosure can be stably fixed to the ground G even when an external impact occurs during transport. Accordingly, the present disclosure may improve safety.

FIG. 2 is an exploded perspective view schematically showing a fixing member of a battery rack, according to an embodiment of the present disclosure.

Referring to FIG. 3, the battery rack 100 of the present disclosure may further include a fixing member 126. The fixing member 126 may include a fixing portion 126a, a ring portion 126b, and a bent portion 126c. The fixing portion 126a may be fixed to the ground G. For example, the fixing portion 126a may have a plate shape extending in a horizontal direction so as to face the ground G. A fixing hole H2 into which a bolt B is inserted may be formed in the fixing portion 126a. The ground G hole (not shown) communicating with the fixing hole H2 may be provided in the ground G. The fixing portion 126a may be coupled to the ground G by inserting and fixing the bolt B to each of the fixing hole H2 and the ground G hole.

Also, the ring portion 126b may have a ring shape. A portion of the ring portion 126b may be coupled to the fixing portion 126a. For example, the ring portion 126b may be fixed in the form in which the insertion portion 125a penetrates the fixing portion 126a. An end portion of the insertion portion 125a may-be coupled to the ground G.

Furthermore, the bent portion 126c may have a structure that is bent at least twice and extends. The bent portion 126c may have a portion that is bent upward from the fixing portion 126a and a portion that is bent again in a horizontal direction from an end portion of the portion that is bent upward. The bent portion 126c may cover a lower bar 123 (see FIG. 2) provided on a lower portion of the rack case 120. For example, as shown in FIG. 1, the fixing member may include the fixing member 126 in each of a front portion, a rear portion, and left and right side portions when viewed in an F direction. The fixing members 126 each include the ring portion 126b, but are not limited thereto, and some fixing members 126 may not include the ring portion 126b as necessary.

Furthermore, in the related art, because the strap 130 may only be fixed to the ground G, there is a limitation that a fixing position of the strap 130 may not be changed arbitrarily. In contrast, the present disclosure has an advantage in that an end portion of the strap 130 may be threaded or tied and fixed to a desired position by utilizing the ring portion 126b of the fixing member 126 in a container or a truck, and a more efficient arrangement of the strap 130 may be achieved, thereby increasing fixing power of the battery rack 100 and maintaining stable fixing.

Figure 4:
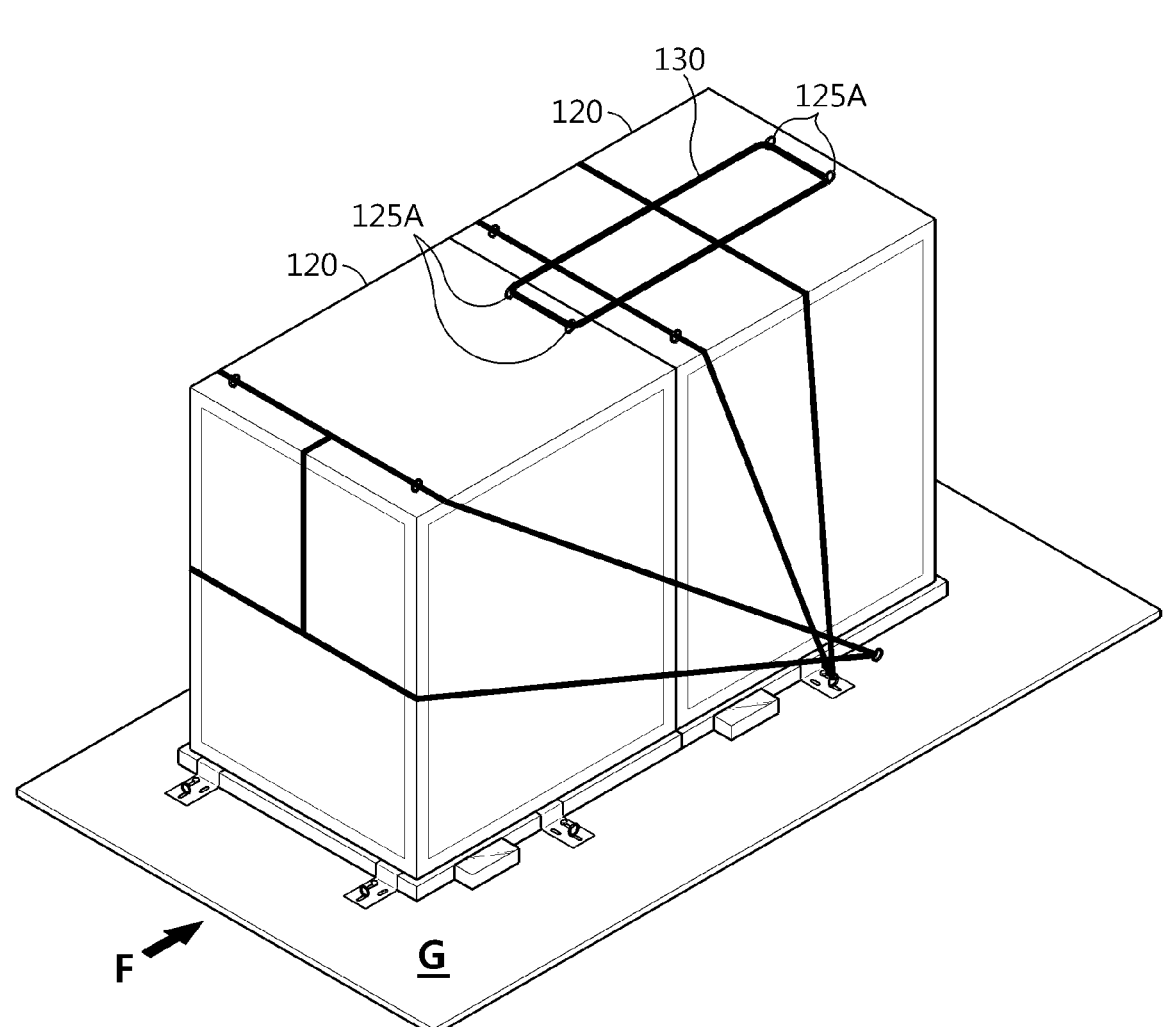
FIG. 4 is a perspective view schematically showing rack cases according to another embodiment of the present disclosure.

FIG. 4 is a perspective view schematically showing rack cases according to another embodiment of the present disclosure.

Referring to FIG. 4, a battery rack 100 according to another embodiment of the present disclosure may include two more rings 125A, as compared to the battery rack 100 of FIG. 1. In order to bind one rack case 120 and another rack case 120 together, the strap 130 may be threaded through the additional two rings 125A provided on each of the rack cases 120. For example, as shown in FIG. 4, in battery racks 100 arranged in front and rear directions, the strap 130 is threaded through each of two rings 125A located at the rear in an upper surface of a rack case 120 located relatively forward and two rings 125A located at the rear in an upper surface of a rack case 120 located relatively backward, and upper portions of the rack cases 120 may be bound to each other by the strap 130.

Therefore, according to this configuration of the present disclosure, in the present disclosure, a rack case 120 may be bound to another neighboring rack case 120 by using the rings 125A located on the rack cases 120, and it is possible to prevent an arrangement of a plurality of rack cases 120 arranged in one direction from being disturbed by an external impact or external force during transport or prevent the rack cases 120 from being damaged due to collision of the rack cases 120 during transport.

Referring back to FIG. 1, the battery rack 100 of the present disclosure may further include a support member 140. The support member 140 may have a lower portion of a body to be fixed to a ground G of an installation place and a side portion of the body supporting a side portion of the rack case 120. The support member 140 may include reinforced plastic or wood material. For example, the support member 140 may have a rectangular parallelepiped shape. The support member 140 may be fixed to the ground G by using nails or adhesives.

Therefore, according to this configuration of the present disclosure, the present disclosure further includes the support member 140 to support the rack case 120, thereby effectively limiting movement of the battery rack 100 in one direction. Accordingly, it is possible to effectively prevent the battery rack 100 from being moved by an external force, thereby, during transport, reducing the possibility of damage and greatly improving safety.

Referring back to FIG. 1, the battery rack 100 of the present disclosure may include two or more rack cases 120 arranged in front and rear directions. Also, the battery rack 100 may include a plurality of straps 130. The straps 130 may cover a front surface of a rack case 120 located relatively forward among the two or more rack cases 120 arranged in the front and rear directions. Also, both end portions of each of the straps 130 may be fixed to the ground G or the ring portion 126b of the fixing member 126.

For example, as shown in FIG. 1, both end portions of the strap 130 may be threaded through or tied and fixed to the ring 125 provided on the ground G. The strap 130 may cover a front surface of a rack case 120 located relatively forward.

Therefore, according to this configuration of the present disclosure, in the present disclosure, the strap 130 covers a front surface and an upper surface of the rack case 120 located relatively forward among the two or more rack cases 120 arranged in the front and rear directions. Accordingly, when the plurality of rack cases 120 are transported while being stacked and arranged in the front and rear directions, a foremost located rack case 120 may be pressed forward by a rack case 120 located backward, and in this state, a force pressed forward may be blocked.

Figure 5:
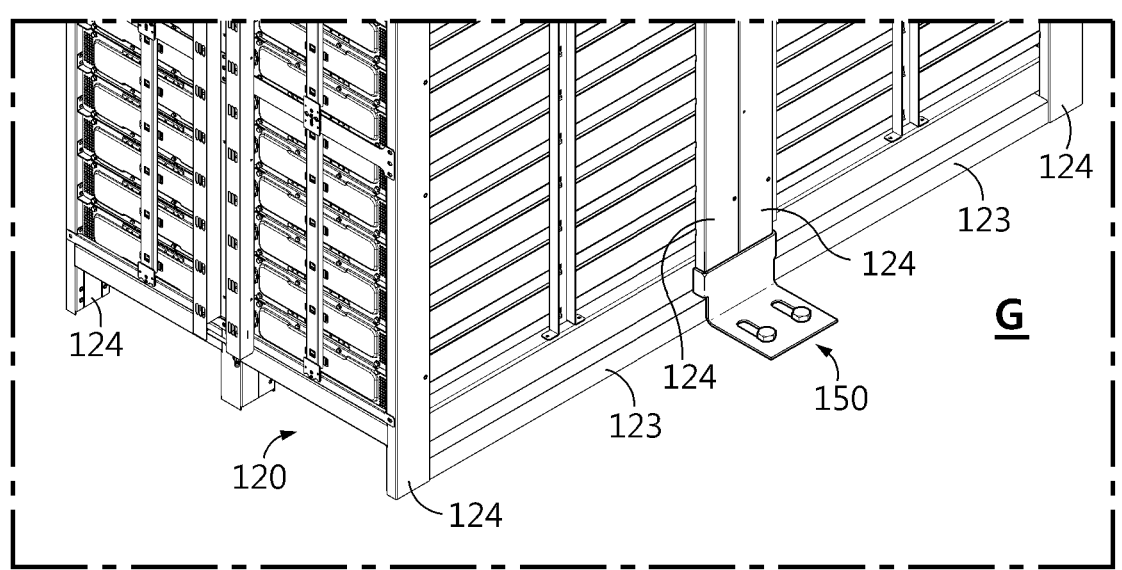
FIG. 5 is a partial perspective view schematically showing a lower portion of a battery rack, according to another embodiment of the present disclosure.

FIG. 5 is a partial perspective view schematically showing a lower portion of a battery rack, according to another embodiment of the present disclosure. In addition, FIG. 6 is a perspective view schematically showing a stopper of a battery rack, according to another embodiment of the present disclosure.

Figure 6:
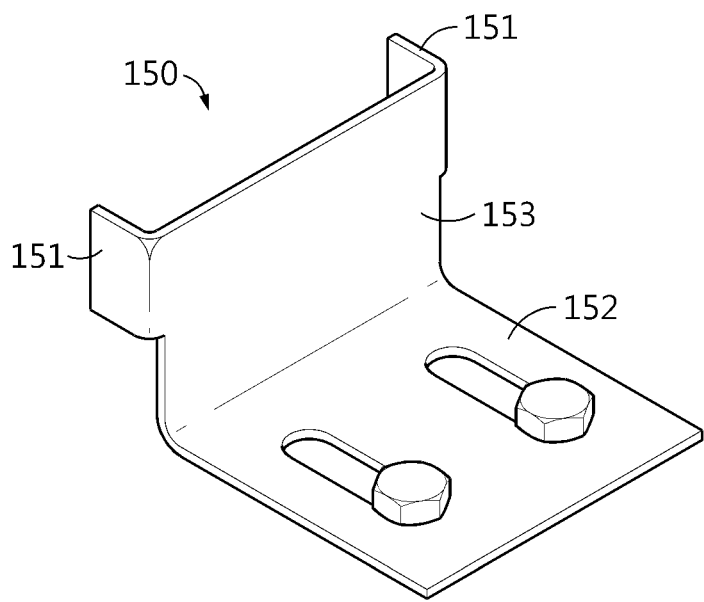
FIG. 6 is a perspective view schematically showing a stopper of a battery rack, according to another embodiment of the present disclosure.

Referring to FIGS. 5 and 6 together with FIG. 2 again, a rack case 120 of a battery rack 100 according to another embodiment of the present disclosure may include at least four pillar portions 124 extending in upward and downward directions. Also, a battery rack 100 according to another embodiment of the present disclosure may further include a stopper 150. The stopper 150 may bind two rack cases 120 together. The stopper 150 may include a restraining portion 151 that is bent and extends in the form covering a pillar portion 124 of each of the two rack cases 120.

More specifically, the stopper 150 may further include a horizontally extended portion 152 and a vertically extended portion 153. The vertically extended portion 153 may have a plate shape extending in a horizontal direction so as to be fixed to a ground G. The vertically extended portion 153 may have a shape bent upward from an end portion of the horizontally extended portion 152 along a side portion of the pillar portion 124 of the rack case 120.

Also, the restraining portion 151 may protrude and extend from each of both end portions of the vertically extended portion 153 toward each of pillar portions 124 of each of the at least two rack cases 120. For example, the restraining portion 151 may have a shape protruding and extending from a front end portion of the vertically extended portion 153 to cover an outer surface of a pillar portion 124 of a rack case 120 located relatively forward among racks cases 120 arranged in front and rear directions. The restraining portion 151 may have a shape protruding and extending from a rear end portion of the vertically extended portion 153 to cover an outer surface of a pillar portion 124 of a rack case 120 located relatively backward.

Meanwhile, a power storage device according to an embodiment of the present disclosure may include at least one battery rack 100 according to the present disclosure. Also, the power storage device according to the present disclosure may be implemented in various forms, such as a smart grid system or an electric charging station.

Meanwhile, a container according to an embodiment of the present disclosure includes at least one battery rack 100. Also, the container may be a container for cargo. For example, the container may be a dry container having an inner ground G including wood material, or a refer container including a refrigerator in which an inner ground G includes a metal material and a rail structure is formed on the ground G.

Meanwhile, although the terms indicating directions such as up, down, left, right, front, and back are used in the present specification, it would be obvious to a person skilled in the art that the terms are only for convenience of description and may vary depending on the position of an object or the position of an observer.

As described above, although the present disclosure has been described with reference to limited embodiments and drawings, the present disclosure is not limited thereto, and various modifications and variations are possible within the technical idea of the present disclosure and the scope of equivalents of the claims to be described below by those of ordinary skill in the art to which the present disclosure pertains.

| [Explanation of numeral references] | |
| --- | --- |
| 100: Battery rack | |
| 110: Battery module | 111: Module housing |
| 120: Rack case | 121: Rack frame |
| 124: Pillar portion | |
| 130: Strap | 125: Ring |
| 126: Fixing member | |
| 126a, 126b, 126c: Fixing portion, Ring portion, Bent portion | |
| 140: Support member | 150: Stopper |
| 151, 152, 153: Restraining portion, Horizontally extended portion, Vertically extended portion | |
| 160: Packaging material | |
| B: Bolt | H1, H2: Bolting hole, Fixing hole |

What is claimed is:

1. A battery rack comprising:
a plurality of battery modules;
at least one rack case to accommodate the plurality of battery modules;
at least two rings located on the at least one rack case;
a strap connected to the at least two rings; and
a fixing member comprising:

a fixing portion configured to be fixed to a ground;
a ring portion located on the fixing portion; and
a bent portion that is bent at least twice and extends from the fixing portion to cover a portion of the at least one rack case.

2. The battery rack of claim 1 wherein the at least one rack case comprises at least two rack cases arranged in a horizontal direction, and
wherein the strap is threaded through a ring provided on each of the at least two rack cases so that the at least two rack cases are bound to each other.

3. The battery rack of claim 1, further comprising a support member having a lower portion of a body fixed to a ground of an installation place and having a side portion of the body supporting a side portion of the rack case.

4. The battery rack of claim 1, wherein the at least one rack case comprises two or more rack cases arranged in a horizontal direction, and
wherein the strap covers a front surface of a rack case located relatively forward among the two or more rack cases arranged in the horizontal direction.

5. The battery rack of claim 4, wherein each of the two or more rack cases comprises at least four pillar portions extending in a vertical direction, and
wherein a stopper comprising a restraining portion that is bent covers a first pillar portion of each of the two or more rack cases.

6. The battery rack of claim 5, wherein the stopper further comprises:
a horizontally extended portion extending in a horizontal direction to be fixed to a ground; and
a vertically extended portion extending, from the horizontally extended portion, upward along a side portion of the rack case, and
wherein the restraining portion protrudes and extends from the vertically extended portion toward the first pillar portion of each of the two or more rack cases.

7. The battery rack of claim 1, further comprising a packaging material to cover an outer surface of the at least one rack case.

8. A power storage device comprising at least one battery rack according to claim 1.

9. A container comprising at least one battery rack according to claim 1.

10. A battery rack comprising:
a plurality of battery modules;
at least one rack case to accommodate the plurality of battery modules;
at least two rings located on the at least one rack case; and
a strap connected to the at least two rings,
wherein the at least one rack case comprises two or more rack cases arranged in a horizontal direction, and
wherein the strap covers a front surface of a rack case located relatively forward among the two or more rack cases arranged in the horizontal direction.

11. The battery rack of claim 10, wherein each of the two or more rack cases comprises at least four pillar portions extending in a vertical direction, and
wherein a stopper comprising a restraining portion that is bent covers a first pillar portion of each of the two or more rack cases.

12. The battery rack of claim 11, wherein the stopper further comprises:
a horizontally extended portion extending in a horizontal direction to be fixed to a ground; and a vertically extended portion extending, from the horizontally extended portion, upward along a side portion of the rack case, and wherein the restraining portion protrudes and extends from the vertically extended portion toward the first pillar portion of each of the two or more rack cases.

* * * * *